W. H. ALLEN.
PLANT SUPPORTING DEVICE.
APPLICATION FILED FEB. 21, 1914.
1,129,838.
Patented Mar. 2, 1915.
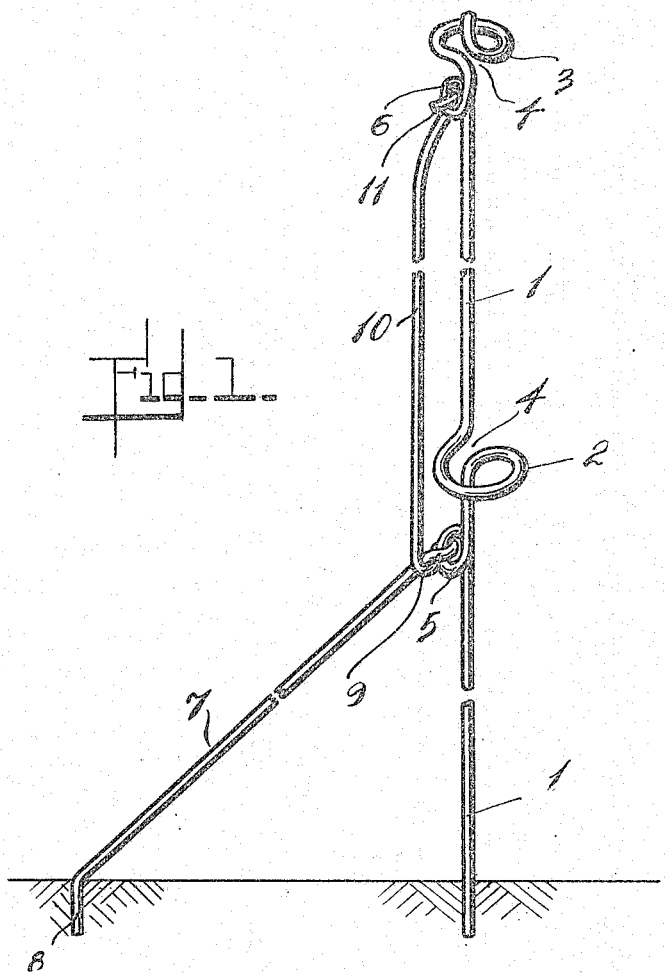
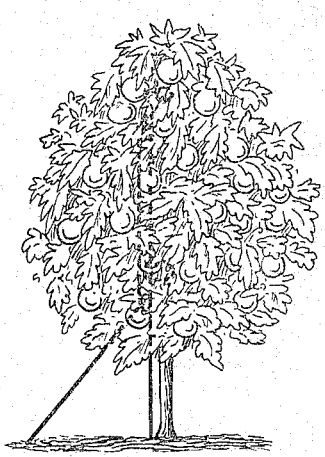
WITNESSES:
INVENTOR
W. H. Allen
BY
J. C. Ledbetter
ATTORNEY

UNITED STATES PATENT OFFICE.

WILLIAM H. ALLEN, OF GALLATIN, TEXAS.

PLANT-SUPPORTING DEVICE.

1,129,838.  Specification of Letters Patent.  Patented Mar. 2, 1915.

Application filed February 21, 1914. Serial No. 820,117.

*To all whom it may concern:*

Be it known that I, WILLIAM H. ALLEN, a citizen of the United States of America, residing at Gallatin, Texas, have invented certain new and useful Improvements in Plant-Supporting Devices, of which the following is a specification.

My invention relates to all manner of plant supporting and sticking devices for use in, what is known to gardeners and agriculturists as, sticking the plants.

The primary object of the invention is to provide a simple form of support member that will be highly adaptable to use in sticking and supporting all manner of plants such as tomato and all other form of tender and frail plants that necessarily need support during their fruit bearing period.

Another object of the invention is to provide a means for the purpose specified which any gardener or agriculturist can easily and inexpensively provide.

With these and other objects in view the invention has relation to certain features of form and structure illustrated in the accompanying drawings and described in the following specification wherein:

Figure 1 is a view of the support member apart from the plant. Fig. 2 is view of the support member, the application of same being illustrated in connection with a plant.

Referring more in particular to the drawings, wherein the same reference numerals refer to similar elements throughout the views, the numeral 1 designates a substantially vertical metallic wire staff or rod adapted to have its lower extremity thrust slightly into the earth in proximity to the body of the plant with which it correlates. The substantially vertical staff has the several modifications and variations from its vertical form as later indicated. A helical loop 2 is formed in the member the desired distance from the ground to meet the requirements of the body of the particular plant the staff is intended to support. The loop 3 is formed on the upper extremity of the staff and is adapted to receive the upper foliage or body of the plant and retain same in a vertically and alined position relative to the rest of the plant body. The loops referred to are formed, as illustrated in substantially large peripheral proportions, and are provided with the openings 4. The material used for these support members will preferably be of ordinary large gage soft iron wire. The large loops can be spread or sprung open at the openings 4 and the plant body or foliage introduced thereinto. The size of the loops allows the plant body and foliage to be loosely confined therein without cramping or injuring said plant. Minor coils or loops 5 and 6 are formed in the staff in proximity to the loops 2 and 3 and are adapted to receive and form a firm and substantial joint to a member later mentioned.

A diagonal brace member 7 has a portion 8 of its extremity thrust vertically into the earth. The brace member is bent or coiled around through the loop 5 as indicated by the numeral 9. The brace then extends vertically upward and parallel to the member 1, as indicated by the numeral 10, the upper extremity being passed through the coil 6 and bent over in the form of a hook 11.

In case extra tall plants are to be stuck or supported, the staff or rod 1 may be provided with an increased number of loops similar to the loops 2 and 3. At the same time the coils 5 and 6 would preferably be correspondingly increased in number. In such case the member 10 would be consecutively passed through the plurality of coils provided.

It is seen how the two parallel members 1 and 10 spaced apart by a number of rigidly formed joints form a rigid truss construction, which will resist to a considerable degree a tendency for the plant to bend or be distorted from its vertical growth. The brace member 7 forms a substantial support against a lateral pull or pressure to which the plant might be subjected. In the Gulf and Coastal States where the winds are prevalent and seldom change their direction, this form of truss and support member will be appreciated by the growers in that the brace member and general arrangement of its few parts may be so disposed as to retain the plant against the lateral pressure of the wind.

The invention is presented as including all such modifications and changes as may properly come within the scope of the following claims.

What I claim is:

1. In a support member for plants of the character described, a vertical rod member, a plurality of loops or curls formed in the vertical rod, said loops formed substantially of small diameter and adapted to confine the trunk or body of the plant to be supported, said loops or curls provided with openings for receiving the trunk or body of the plant, smaller loops or curls formed on the said vertical rod member, and a diagonal and truss member integrally formed and correlated with the smaller loops or curls formed on the vertical rod member.

2. In a support member for plants, and of the character described, a vertical rod member, a plurality of loops or curls formed in the vertical rod, said loops formed substantially of small diameter and adapted to confine the trunk or body of the plant to be supported, said loops or curls provided with openings for receiving the trunk or body of the plant, smaller curls or loops formed on the vertical rod member and adjacent to the curls or loops first mentioned, a vertical truss member fixed to the smaller curls or loops and lying in parallel proximity to the vertical rod member and one extremity of the truss member being outwardly directed from the lower curl or loop of smaller diameter and forming a diagonal brace.

In testimony whereof, I affix my signature in the presence of two witnesses.

WILLIAM H. ALLEN.

Witnesses:
 C. F. WARD,
 P. E. HENRY.